United States Patent
Asboth et al.

(10) Patent No.: US 9,297,463 B2
(45) Date of Patent: Mar. 29, 2016

(54) INSERTION FOR SINGLE-GRIP MIXING FAUCET WITH INCREASED COMFORT ANGLE

(75) Inventors: Laszlo Asboth, Halasztelek (HU); Gyorgy Bolgar, Budapest (HU)

(73) Assignee: KEROX IPARI ES KERESKEDELMI KFT., Diosd (HU)

( * ) Notice: Subject to any disclaimer, the term of this patent is extended or adjusted under 35 U.S.C. 154(b) by 260 days.

(21) Appl. No.: 12/960,689

(22) Filed: Dec. 6, 2010

(65) Prior Publication Data

US 2011/0146821 A1 Jun. 23, 2011

(30) Foreign Application Priority Data

Dec. 21, 2009 (HU) .................................... 0900797

(51) Int. Cl.
 *F16K 11/078* (2006.01)
(52) U.S. Cl.
 CPC ....... *F16K 11/078* (2013.01); *Y10T 137/87676* (2015.04)
(58) Field of Classification Search
 CPC .............. F16K 11/065; F16K 11/0655; F16K 11/0782; F16K 11/0787; F16K 11/078; Y10T 137/87676
 USPC ........ 137/625.17, 625.4, 625.44, 625.46, 801
 See application file for complete search history.

(56) References Cited

U.S. PATENT DOCUMENTS

| | | | | | |
|---|---|---|---|---|---|
| 4,183,377 | A | * | 1/1980 | Bernat | 137/625.17 |
| 4,362,186 | A | * | 12/1982 | Parkison et al. | 137/625.17 |
| 4,621,659 | A | * | 11/1986 | Pawelzik | 137/625.17 |
| 5,329,958 | A | * | 7/1994 | Bosio | 137/269 |
| 5,435,348 | A | * | 7/1995 | Nakamura et al. | 137/625.17 |
| 5,735,312 | A | * | 4/1998 | Schneider | 137/625.4 |
| 5,857,489 | A | * | 1/1999 | Chang | 137/625.17 |
| 7,040,348 | B2 | * | 5/2006 | Bolgar et al. | 137/625.41 |
| 7,134,452 | B2 | * | 11/2006 | Hiroshi et al. | 137/625.41 |
| 8,109,292 | B2 | * | 2/2012 | Bolgar et al. | 137/625.17 |
| 8,327,882 | B2 | * | 12/2012 | Li et al. | 137/625.4 |
| 2004/0069358 | A1 | * | 4/2004 | Knapp et al. | 137/625.17 |
| 2004/0187936 | A1 | * | 9/2004 | Chen | 137/625.17 |
| 2006/0174955 | A1 | * | 8/2006 | Huang | 137/625.17 |
| 2009/0255599 | A1 | * | 10/2009 | Bolgar et al. | 137/625 |

* cited by examiner

*Primary Examiner* — Craig Schneider
*Assistant Examiner* — Frederick D Soski
(74) *Attorney, Agent, or Firm* — Dowell & Dowell, PC

(57) ABSTRACT

A single-grip mixing faucet including a control unit with ceramic piece, a cartridge having one side connected to a footing and another side connected to an operating arm and wherein the cartridge includes a fixed inlet disc mounted to the footing and having one side engaged by one side of a movable control disc so as to form a mixing space, and wherein an opposite side of the control disc is engaged by a ceramic disc mover which is connected to the operating arm, and wherein a throttling element extends from the disc mover into the control disc for adjusting an angle between the inlet and control disk to regulate a range of a comfort temperature region of water flowing from the faucet, and wherein a cold water inlet and a hot water inlet are provided in the footing together with a mixed water outlet for water flowing out of the faucet.

7 Claims, 6 Drawing Sheets

INSERTION FOR SINGLE-GRIP MIXING FAUCET WITH INCREASED COMFORT ANGLE

BACKGROUND OF THE INVENTION

1. Field of the Invention

The invention relates to an insertion piece of a single-grip mixing faucet, i.e. cartridge, in which the range of the so called comfort angle has been increased as compared to the known solutions.

2. Brief Description of the Related Art

Single-grip faucets are used for controlling the mixing ratio i.e. the temperature and the flow of the water passing through by mixing cold and hot water so that simultaneously the amount of the water is also controlled. Such faucets are applied mainly for bathtubs, showers, lavatories or sinks. The insertion piece i.e. cartridge is a control unit, which serves for controlling the amount and temperature of the water flowing through it. The control unit comprises an inlet disc and an adjustable control disc forming together a plane sealing. The inlet disc arranged first in respect of the flow direction is stationary i.e. fixed and the control disc arranged above the former is able to displace in its plane. The side of the control disc opposite to the side facing the inlet disc is in driving connection with a ceramic disc mover being in driving connection with the operating arm of the faucet. One of the inlet ports is connected to the cold water network, whereas another one is in connection with the hot water network, and via the outlet port, water of a required temperature determined by the position of the two ceramic discs leaves the cartridge. One of the most important feature of the cartridges is the so-called comfort region meaning the angle region run over by the cartridge arm when rotating around the axis of the cartridge, while the temperature of the water changes between 34 and 42° C. or 42 and 34° C., the most frequently used temperature range. This range is now defined in a standard, but the solution provided in the invention is suitable for operating in every optional range.

In order to adjust this temperature range, the operating arm being coaxial with the axis of the cartridge in the known solutions should rotate in an angle range of about 14°. This is quite disadvantageous because in order to change a certain temperature, the angle by which the arm should be turned is too small, and this is quite uncomfortable. Another draw-back is that e.g. at taking a shower, an accidental knocking of the operating arm can result in a sudden rise or decrease of the temperature of the water flowing out, what may be very unpleasant.

SUMMARY OF THE INVENTION

The object of the invention is to develop the cartridge so that the comfort angle range of the rotation of the arm is increased significantly while keeping the total mixing region of the cartridge unchanged. The increase of the rotation angle range of the comfort region can be achieved when rotating the control disc in order to change a ratio between hot water inlet cross-section and the cold water inlet cross-section as little as possible. This means that the rotation angle of the operating arm ensuring temperatures 34° C.-42° C., or in the opposite direction 42° C.-34° C. is increased significantly. This increased value is a rotation angle of about 34°. This larger angle helps the user to adjust the temperature more accurately increasing thereby the feeling of comfort.

The recognition of the invention was that at the part of the ceramic disc mover being in contact with water, where the cold or hot water arrives from the inlet port, a throttling element is built in covering partially the inlet ports radially and laterally. The height of the throttling element is determined by the thickness of the control disc. This arrangement ensures that by moving the rotation arm of the cartridge (resulting in rotation of the ceramic disc mover and the control disc) the ratio between the cross-sections of the cold water inlet port and the warm water inlet port changes only slightly. Since the volume flow rate of the cold water and warm water changes less with the rotation of the operating arm around the axis of the cartridge, the temperature of the mixed water leaving the cartridge increases or decreases more slowly. This effect can be increased or decreased by changing the dimensions of the throttling built into the cartridge.

Thus, the objective of the invention is a single-grip mixing faucet provided with a control unit with the so-called cartridge, having ceramic discs, one side of the cartridge arranged first in respect of the flow direction is connected to an operating arm the other side is connected to a footing; the cartridge comprises a stationary, fixed inlet disc arranged first in respect of the flow direction and an adjustable control disc forming together a plane sealing, whereas the control disc is in driving connection with the ceramic disc mover on its side opposite to the inlet disc, which ceramic disc mover is in a connection with an operating arm; on the base there are inlets for the hot and cold water and an outlet for the mixed water.

The essence of the faucet according to the invention lies in the recognition that at the internal surface of the ceramic disc mover a throttling element intruding into the mixing space is included for adjusting of the angle range of the comfort region.

According to a preferred embodiment of the invention the throttling element is an integral part of the ceramic disc mover.

The throttling element may, however, form preferably also an integral part of the control disc, but can be designed also as a separate insertion element, and can be placed as that. This latter solution may be used in earlier existing faucets to modify according to the invention.

The angle range of the comfort region is larger than 25°, preferably it may be even 33-35°.

BRIEF DESCRIPTION OF THE DRAWINGS

The invention can be best understood on the basis of preferred embodiments explained in detail in the drawings.

DESCRIPTION OF THE PREFERRED EMBODIMENT

Figure 1A:
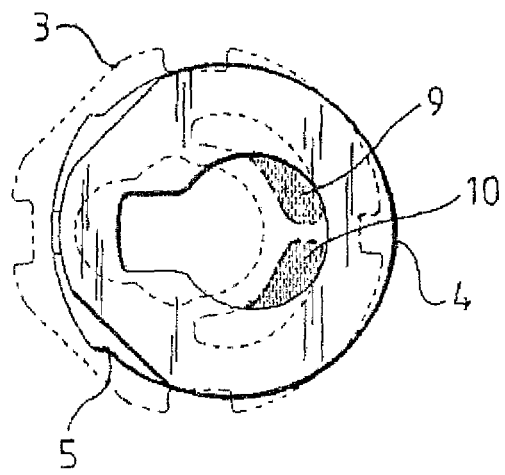
FIG. 1a shows the bottom view of the design of the inlet disc, control disc and ceramic disc mover of the known cartridges.
Figure 1B:
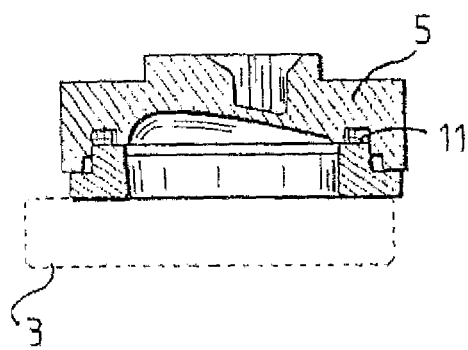
FIG. 1b shows the side sectional elevation of the arrangement in FIG. 1a, In FIGS. 2a and 2b are the bottom views of the opening cross-sections of the cold water inlet and hot water inlet at the different positions of the operating arm, and the angle range of the comfort region can also be seen.

The design of the cartridge with a ceramic disc mover known from the prior art is shown in FIGS. 1*a* and 1*b*. A fixed inlet disc 3 is situated on the bottom fastened to the footing 2 of the cartridge. To the upper plane of inlet disc 3, a control disc 4 is connected which can be rotated and shifted. These movements are ensured by an operating arm with bearings in an arm holder not shown in the figures, by means of a ceramic disc mover 5. In a slot made in ceramic disc mover 5 a sealing 11 is arranged. Thus, the operating arm rotated around the axis of the cartridge rotates control disc 4, as a result of which the ratio of the opening cross-sections of the cold water inlet port 9 and hot water inlet port 10 change as shown in FIGS. 2*a* and 2*b*—changing thereby the temperature of the water flowing out of the cartridge.

Figure 2A:
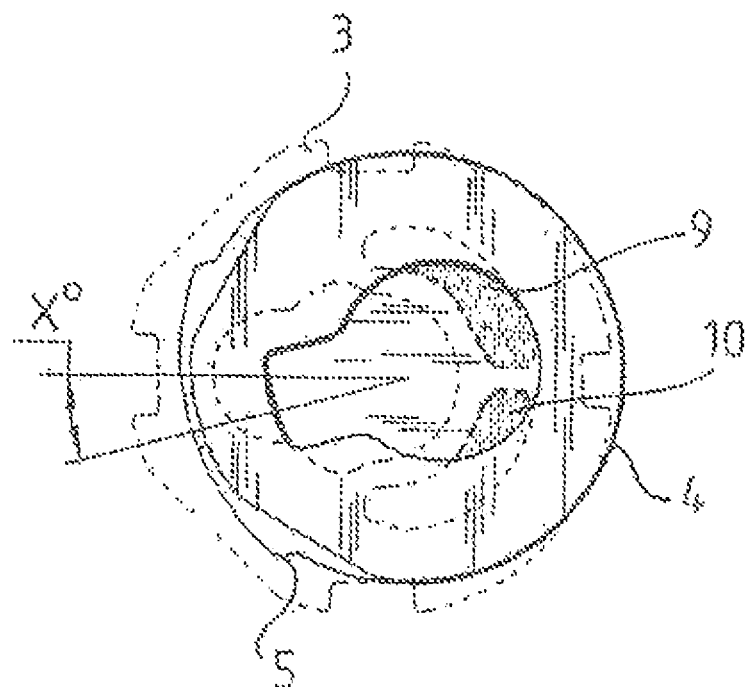
Figure 2B:
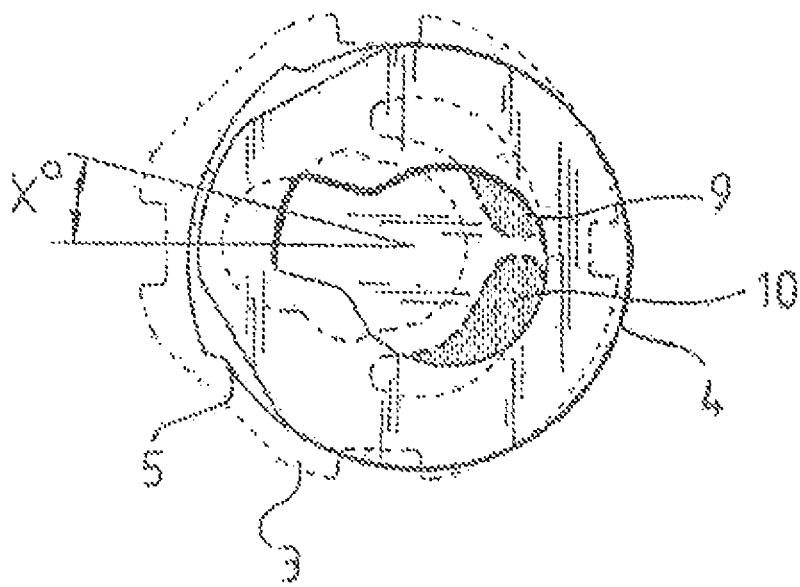

In FIGS. 2*a* and 2*b* the angle range X of the comfort region is marked. The term "comfort region" means the angle range run over by the operating arm of the cartridge rotated around the cartridge axis, while the temperature of the water flowing out from the cartridge increasing from 34° C. up to 42° C., or in the opposite direction, decreasing from 42° C. till 34° C.

Figure 3A:
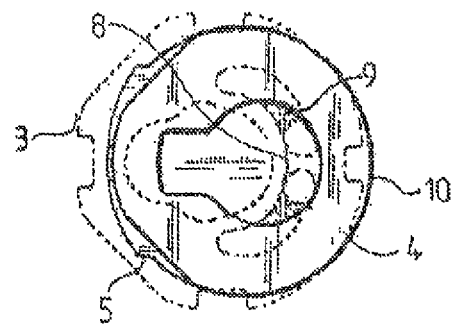
FIGS. 3a and 3b show the design of the inlet disc, control disc and ceramic disc mover as being a preferable embodiment made according to the invention, in bottom view and side-sectional elevations.
Figure 3B:
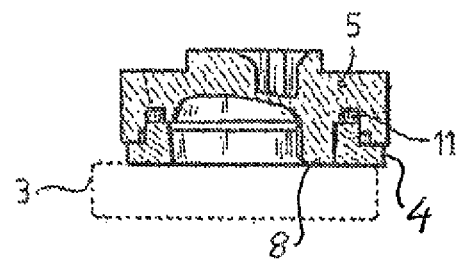

According to the invention the range belonging to the comfort region has been increased, thus rotating the control disc 4 results in the change of the ratio of the cross-sections of the cold water inlet port and hot water inlet ports is reduced, when rotating control disc 4. This requirement is fulfilled by the cartridge according to the invention, the one embodiment of which is shown in FIGS. 3*a* and 3*b*.

The position of the elements is identical with those of the cartridge mentioned earlier. To the upper plane of the fixed inlet disc 3, control disc 4 rotatable and movable by operating arm not shown in the figures, is connected via ceramic disc mover 5.

Figure 4A:
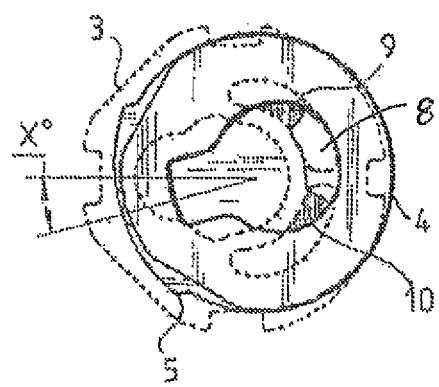
FIGS. 4a and 4b are the opening cross-sections of the cold water inlet port and hot water inlet port of the embodiment shown in FIG. 3 at different positions of the operating arm in bottom view, and the angle range of the comfort region is also shown, In FIGS. 5a and 5b an embodiment of the ceramic disc mover according to the invention is shown in bottom view and in cross-section.
Figure 4B:
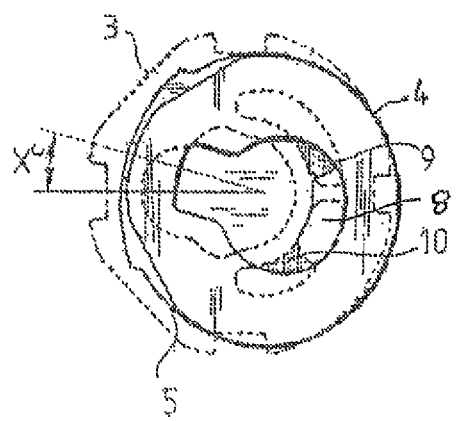
Figure 5A:
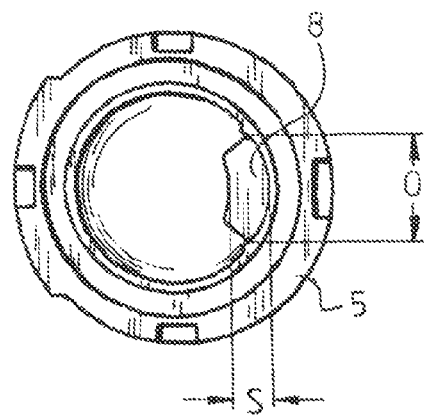
Figure 5B:
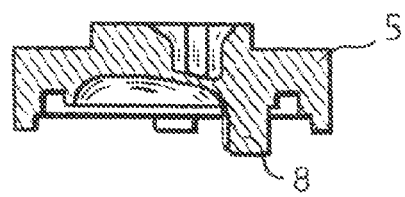

The essence of the new design illustrated in FIGS. 5*a* and 5*b*, consists in the development of ceramic disc mover 5 so that it enables an increase in the angle range of the comfort region in the cartridge. For this purpose, at the site of ceramic disc mover 5 being in contact with water, where cold and hot water arrive from inlet disc 3, a throttling element 8 is built in, the radial and lateral dimensions of which are so that it partially covers the inlet ports radial and lateral direction, the external part of throttling 8 is fitting to the internal surface of control disc 4, and its height is determined by the thickness of control disc 4. This design results in that by rotating the operating arm (due to which the ceramic disc mover and control disc also rotate) within a certain angle, the ratio of the cross-sections of the inlet ports through which water arrives in the mixing space, changes only moderately. As the volume flow of the inflowing cold and hot water changes less by rotating the operating arm around the axis of the cartridge, the temperature of the mixed water leaving the cartridge increases or decreases slower. This effect is shown in FIGS. 4*a* and 4*b*.

Figure 6:
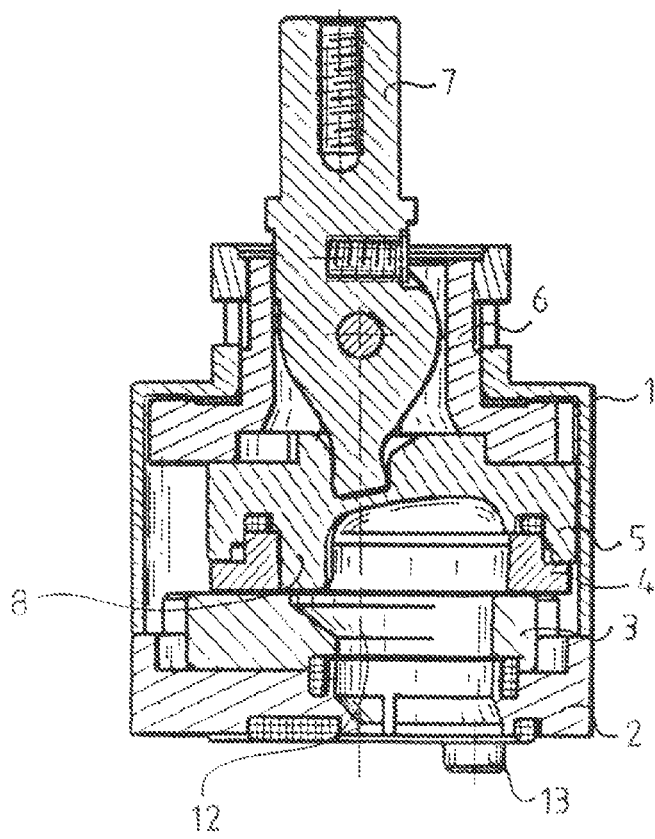
FIG. 6 shows the section of an embodiment serving as an example for the cartridge according to the invention in assembled state.

According to the embodiment of the invention shown, the section of the assembled cartridge with ceramic disc mover 5 is illustrated in FIG. 6.

In FIG. 6, footing 2 is seen on which the fixed inlet disc 3 is placed. Inlet disc 3, together with control disc 4 form a plane sealing which is connected to ceramic disc mover 5 with a sealing 11. Inlet disc 3 and control disc 4 form a mixing space 12. The throttling element 8 forming an integral part of the ceramic disc mover 5 intrude into mixing space 12. Arm holder 6 and the operating arm 7 are also shown. The whole assembly is placed into housing 1 having the mixing space 12 and outlet port 13 in it.

Figure 7:
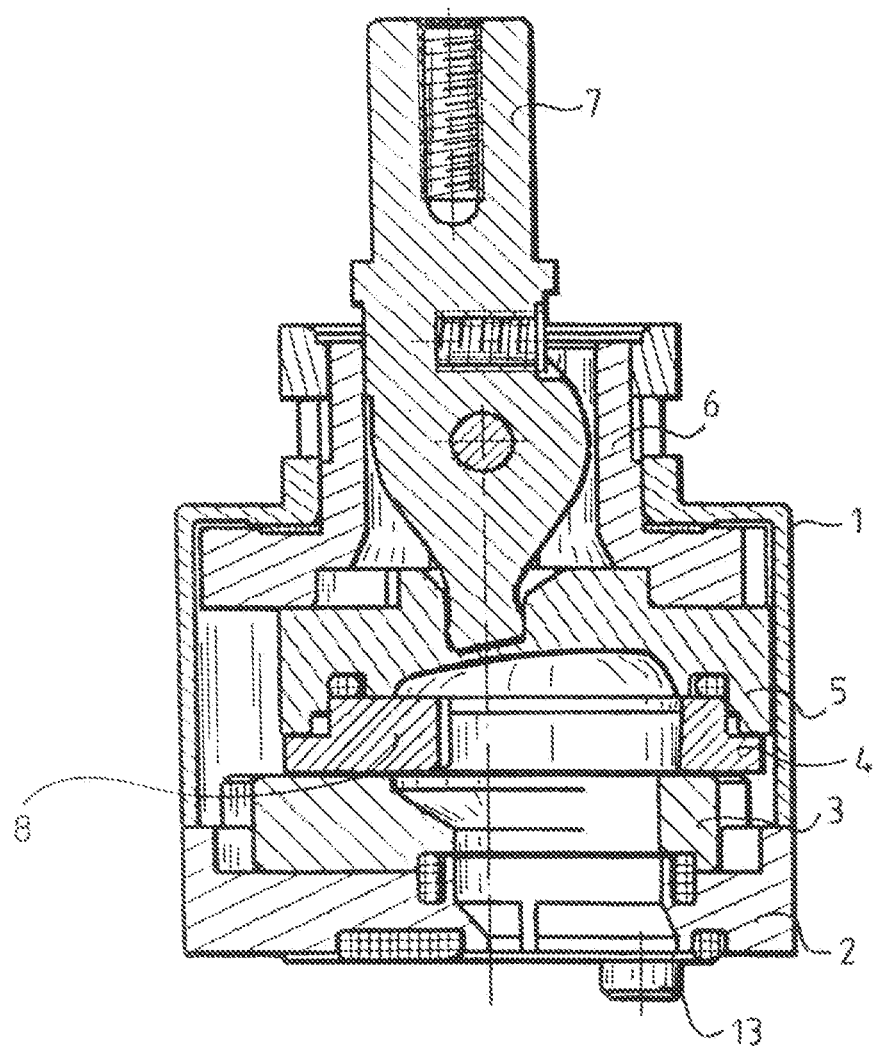
FIG. 7 illustrates another cartridge as a further example for the embodiment according to the invention, in section and in assembled state.
Figure 8:
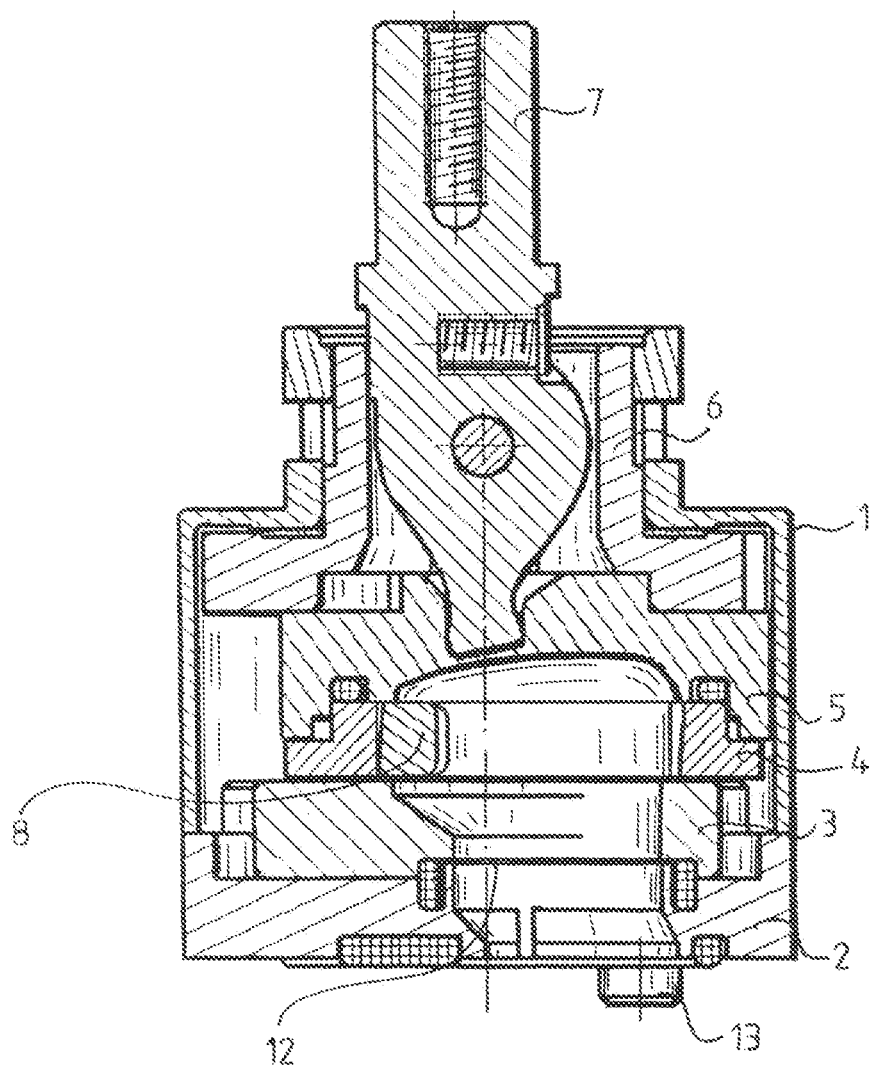
FIG. 8 shows the section of another embodiment of the cartridge according to the invention serving as an example in assembled state.

FIG. 7 shows an embodiment in which throttling element 8 and control disk 4 form an integral part, whereas in FIG. 8 an embodiment is given in which the throttling element 8 is made as a separate insertion piece. This solution can easily be applied when modifying a known cartridge according to the present invention.

The invention claimed is:

1. A cartridge for a single-grip mixing faucet comprising:
   a stationary footing having a substantially disc-like body, having a cold water inlet, a hot water inlet and a mixed water outlet which are located at a first side of the footing;
   a stationary disc of a ceramic material having a central portion with a center, a first face attached to a second opposite side of the footing and an opposite planar second face, the stationary disc defining:
     a cold water inlet opening extending along a first predetermined angular range around the central angular position and being radially offset from the center, the cold water inlet opening communicating with the cold water inlet;
     a hot water inlet opening extending along a second predetermined angular range around the center and forming substantially a continuation of the first angular range and being spaced from the cold water inlet opening by an angular spacing, and the hot water inlet opening communicating with the hot water inlet; wherein the cold and hot water inlet openings have a depth ranging from an inner radius to an outer radius from the center of the central portion; and
     a mixed water outlet opening including the central portion and being separated from the cold and hot water inlet openings and communicating with the mixed water outlet;
   a movable control disc of a ceramic material that can be turned along a third predetermined angular range around the center, the control disc having a first planar face fitted to the planar second face of the stationary disc so that the control disc when being moved slides along the planar second face, the movable control disc defining a substantially central opening which is communicating with the mixed water outlet opening of the stationary disc, and depending on a momentary angular position of the control disc, can cover, partially cover or uncover the cold water and hot water inlet openings of the stationary disc to allow flow of either cold water, mixed cold and hot water and hot water towards the mixed water outlet opening of the stationary disc, and the central opening defining a first part of a mixing space for the mixing of cold and hot water when flowing there through;
   a control disc mover connected to and being moved together with the control disc and fitted to a second face of the control disc which is opposite to the planar first face, the control disc mover defining a cavity facing towards the control disc and communicating with the central opening and constituting a second part of the mixing space, the mixing space acting as a flow path of the mixed water when flowing towards the mixed water outlet opening;

an operating arm lever having a first end portion connected to the disc mover to follow the movement of the operating arm lever, and the operating arm lever has a second end portion, whereby the control disc can be moved at least in angular direction, and a central angular position of the operating arm lever corresponds to a substantially even mixture of cold and warm water;

a housing connected to and holding the stationary footing, the stationary disc, the control disc mover and the operating arm; and a throttle member arranged at least partially in the mixing space, the throttle member having a depth ranging from an inner radius to an outer radius from the center of the central portion, wherein the depth of the throttle member substantially matches the depth of the cold and hot water openings, said throttle member being connected to and moved together with the control disc and the disc mover, and in the central-angular position of the operating arm lever the throttle member is arranged above the spacing and above respective angular portions both of the cold and hot water inlet openings of the stationary disc to decrease a cross section of the flow path along the mixing space between the cold and hot water inlet openings and the mixed water outlet opening, and the throttle member also decreases the flow path in a predetermined angular range around the center position to increase thereby the angular range of the angular movement path of the operating arm lever in which the temperature of the mixed water is comfortable for a human body.

2. The cartridge as claimed in claim 1, wherein the angular cold and hot water inlet openings in the stationary disc have respective substantially constant radial widths.

3. The cartridge as claimed in claim 1, wherein the throttle member forms an integral portion of the control disc mover.

4. The cartridge as claimed in claim 1, wherein the throttle member forms an integral portion of the control disc.

5. The cartridge as claimed in claim 1, wherein the operating arm lever moves the control disc mover and the control disc in a radial direction so that in every angular position, the movement in radial direction controls the flow rate of water through the mixing space.

6. The cartridge as claimed in claim 1, wherein the mixed water outlet opening of the stationary disc widens in a direction towards a fitting plane of the first and second planar faces.

7. The cartridge as claimed in claim 6, wherein the throttle member extends to the fitting plane.

* * * * *